United States Patent [19]

Kapanka

[11] Patent Number: 5,086,989
[45] Date of Patent: Feb. 11, 1992

[54] DUAL EFFORT LINEAR RETRACTOR

[75] Inventor: Harley L. Kapanka, Utica, Mich.

[73] Assignee: General Motors Corporation, Detroit, Mich.

[21] Appl. No.: 618,804

[22] Filed: Nov. 28, 1990

[51] Int. Cl.[5] .................. B60R 22/38; B60R 22/44
[52] U.S. Cl. ........................ 242/107; 242/107.43; 280/807
[58] Field of Search ........ 242/107, 107.4 A, 107.4 B; 280/803, 804, 806, 807, 808

[56] References Cited

U.S. PATENT DOCUMENTS

| | | |
|---|---|---|
| 3,472,552 | 10/1969 | Hopka et al. |
| 3,526,431 | 9/1970 | Boedigheimer |
| 3,528,702 | 9/1970 | Boedigheimer |
| 3,542,425 | 11/1970 | Pringle |
| 3,583,763 | 6/1971 | Settimi et al. |
| 3,667,806 | 6/1972 | Sprecher |
| 3,869,173 | 3/1975 | Haller et al. |
| 4,159,848 | 7/1979 | Manz et al. ............ 297/474 |
| 4,213,652 | 7/1980 | Irwin et al. ............ 297/478 |
| 4,492,348 | 1/1985 | Ziv et al. ............. 242/107.4 A X |
| 4,621,835 | 11/1986 | Edwards ............... 280/803 |
| 4,732,409 | 3/1988 | Colasanti .............. 280/808 |
| 4,997,140 | 3/1991 | Doty .................. 242/107.4 A X |

Primary Examiner—John M. Jillions
Attorney, Agent, or Firm—Charles E. Leahy

[57] ABSTRACT

A reel is rotatably mounted on a reel frame and has a length of belt attached thereto. A track is mounted on the vehicle body and has the reel frame mounted thereon for translation along the track from a retracted position to an extended position. A high effort spring acts between the reel frame and the track to provide high effort retraction of the reel frame and the reel to the retracted position. A low effort spring acts between the reel frame and the reel to provide low effort retraction of the belt toward a wound condition on the reel and permit extension of the belt therefrom. A latch acts between the reel frame and the track to latch the reel frame at the extended position in response to the full unwinding of the belt from the reel and full travel of the reel frame along the track to the extended position. Accordingly, when the latch latches the reel frame to the track, the belt is subjected to only the effort of the low effort spring. A release releases the latch in response to a subsequent full unwinding of the belt from the reel and consequent further movement of the reel frame toward the extended position to thereby permit the return of the belt to the fully retracted position by the retraction efforts of the low effort spring winding the reel and the high effort spring retracting the reel frame along the track.

4 Claims, 4 Drawing Sheets

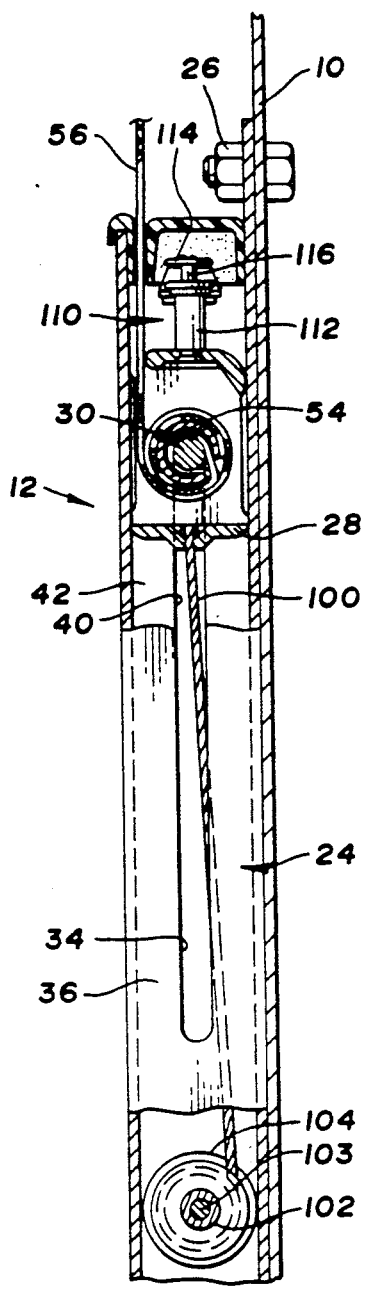
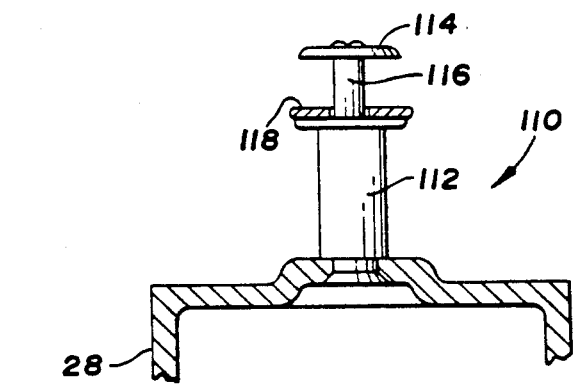
Fig. 4
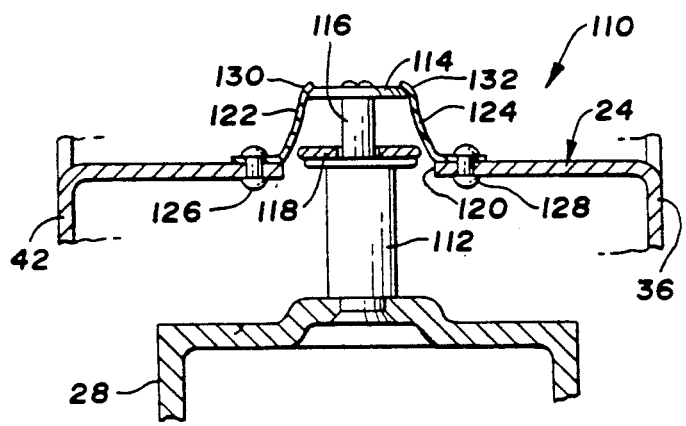
Fig. 5
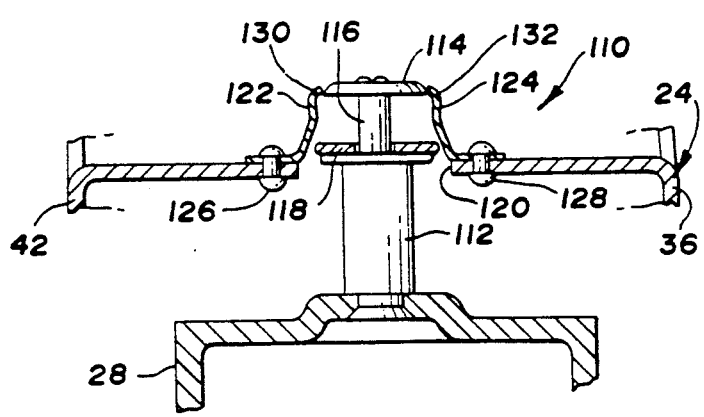
Fig. 6
Fig. 3

DUAL EFFORT LINEAR RETRACTOR

FIELD OF THE INVENTION

The invention relates to a seat belt retractor and more particularly provides a linear seat belt retractor having a high effort spring for storing the belt and a low effort spring providing occupant comfort.

BACKGROUND OF THE INVENTION

It is well known in motor vehicle restraint systems to employ a seat belt retractor having a spring wound reel which retracts a belt to a taut condition about a seated occupant. It is also known to retract the belt about the occupant by attaching the belt to a carriage which is retracted linearly along a rectilinear track.

It has been recognized in the prior art that it would be desirable to provide a retractor which imposes a low spring effort on the belt when the belt is taut about the occupant to enhance the occupant's comfort, and yet the belt would be subjected to a relatively higher spring effort in order to effectively and assuredly retract the belt to a fully stored condition when the belt is unbuckled.

The present invention provides a new and improved retractor in which a seat belt reel winds a belt at a low spring effort and the reel is mounted on a linear track for retraction by a high effort spring to fully retract the belt from the occupant restraining position. A latching mechanism is provided to latch the reel to the track after the reel has been fully extended along the track so that the belt is freed from the high spring effort provided to retract the reel to thereby enhance occupant comfort.

SUMMARY OF THE INVENTION

According to the invention a reel is rotatably mounted on a reel frame and has a length of belt attached thereto. A track is mounted on the vehicle body and has the reel frame mounted thereon for translation along the track from a retracted position to an extended position. A high effort spring acts between the reel frame and the track to provide high effort retraction of the reel frame and the reel to the retracted position. A low effort spring acts between the reel frame and the reel to provide low effort retraction of the belt toward a wound condition on the reel and permit extension of the belt therefrom. A latch acts between the reel frame and the track to latch the reel frame at the extended position in response to the full unwinding of the belt from the reel and full travel of the reel frame along the track to the extended position. Accordingly, when the latch latches the reel frame to the track, the belt is subjected to only the effort of the low effort spring. A release releases the latch in response to a subsequent full unwinding of the belt from the reel and consequent further movement of the reel frame toward the extended position to thereby permit the return of the belt to the fully retracted position by the retraction efforts of the low effort spring winding the reel and the high effort spring retracting the reel frame along the track.

BRIEF DESCRIPTION OF THE DRAWINGS

FIG. 3 is a sectional view taken in the direction of arrows 3—3 of FIG. 1; and

FIGS. 4–10 disclose the various operating conditions of the latch acting between the reel frame and the track.

DESCRIPTION OF THE PREFERRED EMBODIMENT

Figure 1:
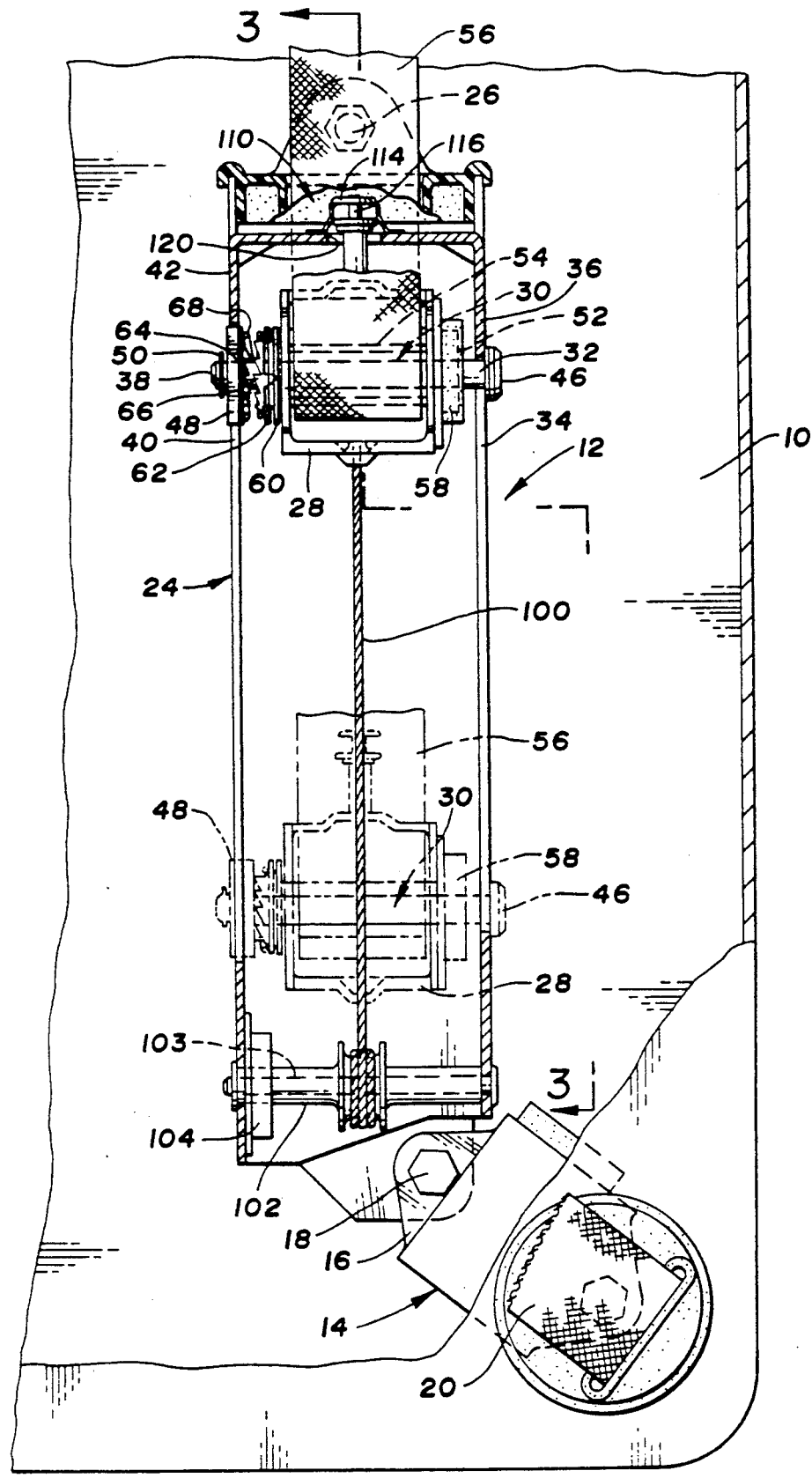
FIG. 1 is a side elevation view of a vehicle door having a seat belt retractor according to the invention mounted thereon.

Referring to FIG. 1 it is seen that a vehicle door 10 carries a seat belt system which includes a shoulder belt retractor 12 and a lap belt retractor 14. The lap belt retractor 14 is conventionally comprised of a frame 16 mounted on the door 10 by bolt 18 and includes a reel, not shown, which winds a lap belt 20. The lap belt extends diagonally upward from the lap belt retractor 14 to extend across the lap of the seated occupant.

Figure 2:
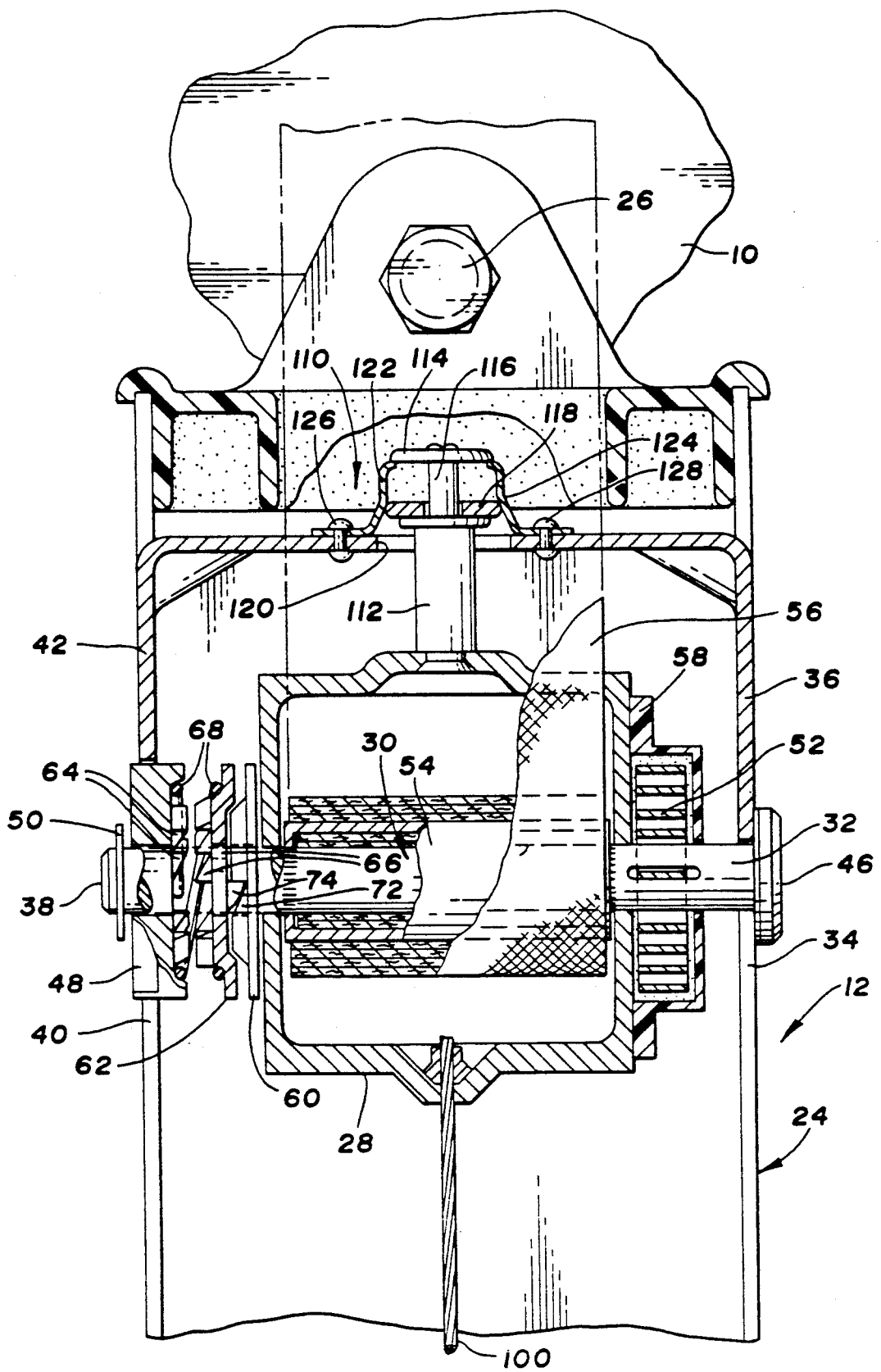
FIG. 2 is an enlarged fragmentary view of FIG. 1.

Referring to FIGS. 1 and 2, it is seen that the shoulder belt retractor 12 includes a tubular track 24 of rectangular cross section which extends vertically inside the door and is attached thereto at the lower end by bolt 18 and at the upper end by nut and bolt assembly 26. A box shaped reel frame 28 is housed within the track 24 and has a close fitting relationship therewith as shown in FIG. 3 so that the reel frame 28 is closely captured within the track 24 for vertical up and down movement but is prevented from rotating within the track 24. The reel frame 28 rotatably carries a reel shaft 30 having right hand end 32 which extends through a slot 34 in a right hand wall 36 of track 24, and a left hand end 38 which extends through a slot 40 in a left hand wall 42 of the track 24. The right hand end 32 carries an enlarged head 46. The left hand end 38 extends through a shoe 48 fitted in the slot 40 and carries a retaining ring 50.

As best seen in FIGS. 2 and 3, a C-shaped belt reel 54 is attached to the shaft 30 for rotation therewith. A shoulder belt 56 has an end passing into the reel 54 and surrounding the reel shaft 30 so that the belt becomes wound on the reel 54. A low effort winding spring 52 acts between the reel shaft 30 and a plastic spring housing 58 mounted on the reel frame 28 to urge the reel 54 in the counterclockwise belt winding direction of rotation as viewed in FIG. 3 so that the shoulder belt 56 is retracted into the retractor.

A belt unwinding sensitive locking mechanism is provided to lock the rotation of the reel 54. In particular, as best seen in FIG. 2 a cam disk 60 is fixedly attached to the reel shaft 30 for rotation therewith. A flywheel 62 fits rotatably on the shaft 32 and is interposed between the cam disk 60 and the shoe 48. The shoe 48 and the flywheel 62 respectively have teeth 64 and 66 which face toward one another. A coil compression spring 68 acts between the shoe 48 and the flywheel 62 to urge the flywheel 62 away from the shoe 48 and into engagement with the cam disk 60. The cam disk 60 and the flywheel 62 respectively have cam surfaces 72 and 74 which mate with one another. Upon a rapid extraction of the shoulder belt 56 from the reel retractor, the rotation of the flywheel 62 will lag behind the rotation of the cam disk 60 so that the cam surfaces 72 and 74 will thrust the flywheel 62 leftwardly and cause engagement of the flywheel teeth 66 with the teeth 64 of the shoe 48. This engagement will lock the reel 54 against rotation relative to the track 24 so that the length of the shoulder belt 56 will thereby become fixed to effectively restrain the occupant.

The reel frame 28 is retracted downwardly within the track 24 by a cable 100 having an upper end attached to the reel frame 28 and a lower end attached to a pulley shaft 102 which is rotatably journalled on the track 24 by a shaft 103. A high effort spiral spring 104 acts between the track 24 and the pulley shaft 102 to urge rotation of the pulley shaft 102 in the direction to wind the cable 100 and thereby retract the reel frame 28 downwardly to the fully retracted phantom line indicated position of FIG. 1 in which the reel shaft 30 reaches the bottom of the slots 34 and 40 of the track 24. In addition, the low effort winding spring 52 will have wound the reel 54 to fully store the shoulder belt 56 within the retractor.

In order to wear the belt, a vehicle user grips the shoulder belt 56 and extracts the shoulder belt from the retractor 12. During the initial extraction, the shoulder belt 56 unwinds from the reel 54 as permitted by the low effort spring 52. After the shoulder belt 56 has been fully unwound from the reel 54, the continued extraction of the shoulder belt 56 by the occupant will cause the reel frame 28 to be lifted vertically upward along the track 24 from the phantom line indicated position of FIG. 1 to the solid line indicated position. When the reel frame 28 reaches the position of FIG. 1 a latch mechanism, generally indicated at 110, becomes engaged to latch the reel frame 28 at its extended position.

In particular, as shown on FIG. 4 the reel frame 28 has a cylindrical stud 112 projecting from the upper side thereof and carrying a latch disk 114 at the end of a necked-down pin 116. A release disk 118 is slideably captured on the pin 116.

Figure 7:
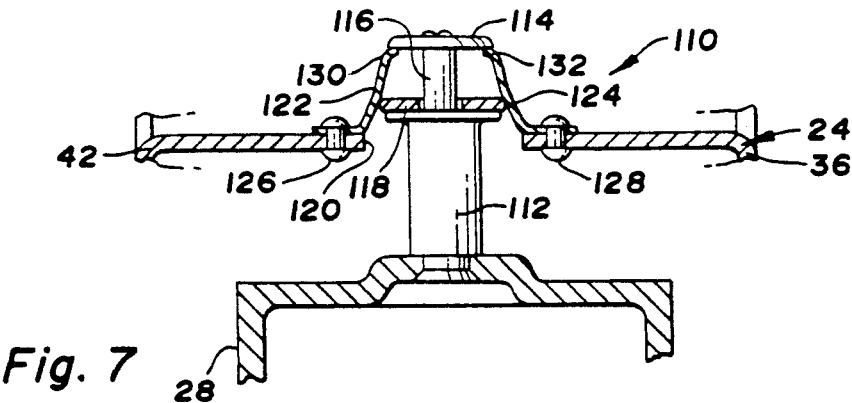

As best seen in FIG. 5, the upper end of the track 24 has a central aperture 120 which is aligned with the stud 112. A pair of opposed facing latch clips 122 and 124 are mounted on the track 24 by rivets 126 and 128 and are arranged to straddle the aperture 120. As seen in FIG. 5, the upward movement of the reel frame 28 carries the latch disk 114 into engagement with the latch clips 122 and 124 and causes the latch clips to spread apart from one another as seen in FIG. 6 to permit the latch disk 114 to obtain the position of FIG. 7 in which the latch clips 122 and 124 snap back toward one another to underlie the latch disk 114. At the same time, the release disk 118 is carried into engagement with the underside of latch clips 122 and 124 to resist further upward movement on the reel frame 28. Accordingly, as the vehicle user pulling the belt senses that the upward movement of the reel frame 28 has progressed to the point where the spring clips 122 and 124 are resisting further movement, the tension on the shoulder belt 56 is relieved so that the reel frame 28 comes to rest at the position of FIG. 7 in which the latch disk 114 will rest upon the latch clips 122 and 124 to thereby hold the reel frame 28 at its extended position of FIGS. 1 and 2. Accordingly, the high effort of the spring 104 is isolated from the feel of the occupant because the latch frame 28 has become latched to the track 24. Thus, the occupant may buckle the belt and only the spring effort of the low effort spring 52 will then act to retract the belt 56 against the occupant. In this way, the occupant comfort is enhanced because only the low effort spring urges retraction of the shoulder belt 56.

Figure 8:
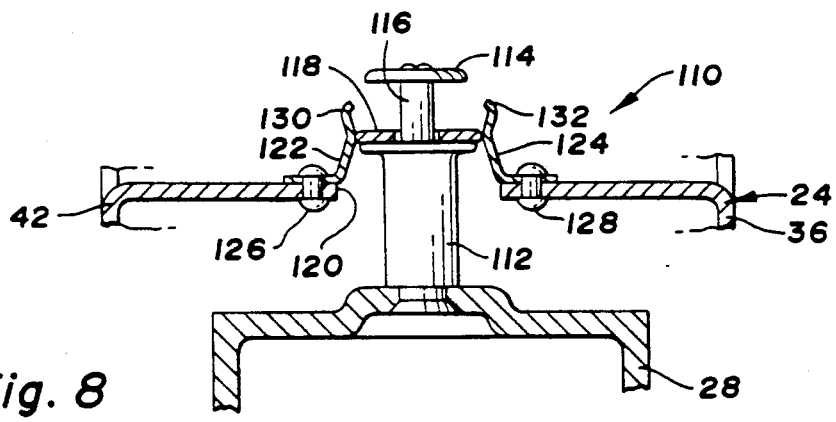
Figure 9:
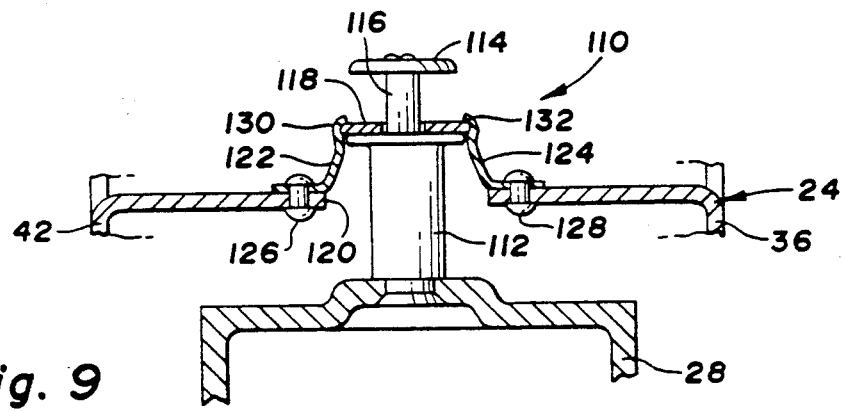
Figure 10:
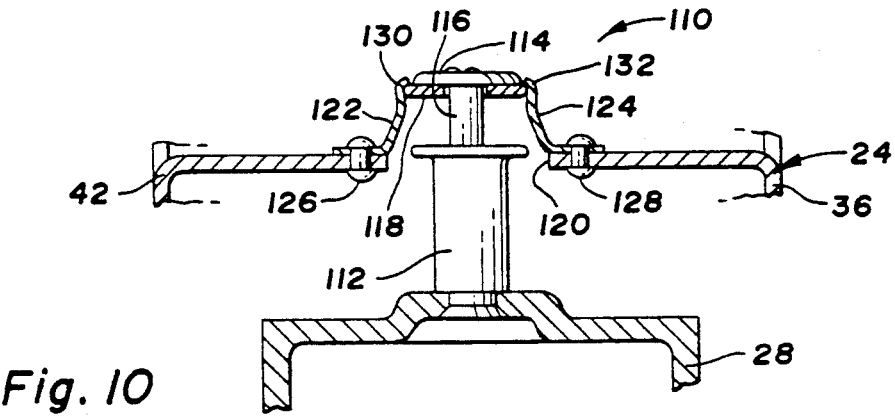

When the occupant wishes to store the belt and exit the vehicle, the belt 56 is gripped and pulled again in the belt extending direction. After the belt becomes fully unwound from the reel 54, a further upward movement of the reel frame 28 causes the release disk 118 to be carried upwardly to spread the latch clips 122 and 124 apart as shown in FIG. 8. This upward movement of the reel frame 28 progresses to the point shown in FIG. 9 where the release disk 118 has become captured within retaining lips 130 and 132 provided at the distal ends of the latch clips 122 and 124. Then the occupant relieves the tension on the belt to permit the high effort of the high effort spring 104 to induce winding of the cable 100 and downward retraction of the reel frame 28 to the position of FIG. 10 in which the latch disk 114 is carried into engagement with the release disk 118. Subsequent further downward movement of the reel frame 28 carries the release disk 118 out of engagement with the latch clips 122 and 124. As best seen in FIG. 10, the outside diameter of the release disk 118 is greater than the diameter of the latch disk 114 so that the latch clips 122 and 124 are prevented from re-engaging with the latch disk 114 and the reel frame 28 is freed for full downward retracting movement to the phantom line indicated position of the FIG. 1.

Thus it is seen that the invention provides a new and improved seat belt retractor in which low winding effort is provided by a low effort spring winding the belt on the reel and a high effort spring winding retraction of the reel along a track to provide high effort full retraction of the belt to a stored position.

The embodiments of the invention in which an exclusive property or privilege is claimed are defined as follows:

1. A seat belt retractor for restraining an occupant in a vehicle, comprising:
    a length of belt;
    a reel rotatably mounted on a reel frame and having the belt attached thereto;
    a track mounted on the vehicle body and having the reel frame mounted thereon for translation along the track from a retracted position to an extended position;
    a high effort spring acting between the reel frame and the track to provide high effort retraction of the reel frame and the reel to the retracted position;
    a low effort spring acting between the reel frame and the reel to provide low effort retraction of the belt toward a wound condition on the reel and permit extension of the belt therefrom;
    latch means acting between the reel frame and the track to latch the reel frame at the extended position in response to the full unwinding of the belt from the reel against the low effort of the low effort spring and full travel of the reel frame along the track to the extended position against the effort of the high effort spring so that the belt is subsequently urged to a taut restraining position about the occupant by only the effort of the low effort spring;
    and release means releasing the latch means in response to a subsequent full unwinding of the belt from the reel and consequent further movement of the reel frame toward the extended position to thereby permit the return of the belt to a fully retracted position by the retraction of the reel frame along the track and winding of the belt upon the reel.

2. The retractor of claim 1 further characterized by belt unwinding sensitive locking means acting between the reel and the reel frame to permit the occupant freedom to move against the low effort reel spring and then lock the length of the belt in response to rapid unwinding of the belt from the reel.

3. The retractor of claim 1 further characterized by said latch means comprising a spring clip carried by the track and latchingly engaged by the reel frame to latch the reel frame at the extended position.

4. The retractor of claim 3 further characterized by said release means being a release element carried by the reel frame and engaging the spring clip upon a subsequent movement of the reel frame in the extending direction to disengage the spring clip from the reel frame to thereby enable the high effort spring to retract the reel frame.

* * * * *